US009430978B2

(12) United States Patent
Xu

(10) Patent No.: US 9,430,978 B2
(45) Date of Patent: Aug. 30, 2016

(54) DISPLAY DRIVE CIRCUIT AND DISPLAY APPARATUS

(71) Applicants: BOE Technology Group Co., Ltd., Beijing (CN); Beijing BOE Display Technology Co., Ltd., Beijing (CN)

(72) Inventor: Yizhen Xu, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 122 days.

(21) Appl. No.: 14/444,154

(22) Filed: Jul. 28, 2014

(65) Prior Publication Data

US 2015/0287373 A1 Oct. 8, 2015

(30) Foreign Application Priority Data

Apr. 4, 2014 (CN) .......................... 2014 1 0136724

(51) Int. Cl.

| | |
|---|---|
| ***G06F 3/038*** | (2013.01) |
| ***G09G 3/36*** | (2006.01) |
| ***G09G 3/18*** | (2006.01) |
| ***G09G 3/00*** | (2006.01) |

(52) U.S. Cl.

CPC ............ *G09G 3/3614* (2013.01); *G09G 3/006* (2013.01); *G09G 3/18* (2013.01); *G09G 2310/08* (2013.01)

(58) Field of Classification Search

CPC ...... G09G 3/3614; G09G 3/006; G09G 3/18; G09G 2310/08

See application file for complete search history.

(56) References Cited

U.S. PATENT DOCUMENTS

| | | | | |
|---|---|---|---|---|
| 2002/0019919 A1* | 2/2002 | Chang | G06F 1/26 711/170 |
| 2006/0232539 A1* | 10/2006 | Hashimoto | G09G 3/3688 345/96 |
| 2014/0043311 A1 | 2/2014 | Shao et al. | |

FOREIGN PATENT DOCUMENTS

| | | | |
|---|---|---|---|
| CN | 1983373 | A | 6/2007 |
| CN | 102087837 | A | 6/2011 |
| CN | 102810301 | A | 12/2012 |
| KR | 10-2005-0123487 | A | 12/2005 |

OTHER PUBLICATIONS

First Chinese Office Action for Chinese Patent Application No. 201410136724.9, dated Jul. 31, 2015, 11 pages.

* cited by examiner

*Primary Examiner* — Andrew Sasinowski
*Assistant Examiner* — Gerald Oliver
(74) *Attorney, Agent, or Firm* — Westman, Champlin & Koehler, P.A.

(57) ABSTRACT

A display drive circuit comprises a timing control module, a source drive module and a polarity selection module. The source drive module is electrically connected to a plurality of data lines. A control signal output from the timing control module is input to the source drive module via the polarity selection module. When the polarity selection module receives only the control signal, the polarity selection module outputs a first control signal, having the same polarity as that of the control signal, to the source drive module. When the polarity selection module receives the control signal and a polarity reversal signal at the same time, the polarity selection module outputs the first control signal, having the same polarity as that of the control signal, and a second control signal, having an opposite polarity to that of the control signal, to the source drive module.

19 Claims, 4 Drawing Sheets

DISPLAY DRIVE CIRCUIT AND DISPLAY APPARATUS

CROSS-REFERENCE TO RELATED APPLICATION

This application claims the benefit of Chinese Patent Application No. 201410136724.9 filed on Apr. 4, 2014 in the State Intellectual Property Office of China, the whole disclosure of which is incorporated herein by reference.

BACKGROUND OF THE INVENTION

1. Field of the Invention

The present invention relates to a display technology field, more particularly, relates to a display drive circuit and a display apparatus comprising the display drive circuit.

2. Description of the Related Art

Since a liquid crystal display has many advantages of, such as, low power consumption, low drive voltage, being capable of being driven simply and directly by a large scale integrated circuit, simple structure, low cost, long life, etc., the liquid crystal display has been being widely applied to a display technology field.

In the prior art, control signals for controlling polarities of data signals output from a source drive module all may have the same polarity, for example, only a positive polarity or only a negative polarity, at the same time. As we all know, it is necessary to perform various optical tests, for example, all black test, all white test, contrast test, color saturation test, flash test, afterimage test, response time test, etc., on liquid crystal display products in the factory. During performing these optical tests, it is often need to use control signals having same frequency and opposite polarities at the same time. Accordingly, the liquid crystal display products in the prior art are not well satisfied with requirements of these optical tests performed in the factory.

SUMMARY OF THE INVENTION

The present invention has been made to overcome or alleviate at least one aspect of the above mentioned disadvantages.

According to an object of the present invention, there is provided a display drive circuit and a display apparatus comprising the display drive circuit, wherein the display drive circuit can output control signals having same frequency and opposite polarities at the same time, so as to satisfy optical test requirements of the display apparatus before they go out.

According to an aspect of the present invention, there is provided a display drive circuit, comprising:

a timing control module;

a source drive module electrically connected to a plurality of data lines and comprising a first type input terminal and a second type input terminal; and a polarity selection module comprising a first type output terminal, a second type output terminal, a first input terminal and a second input terminal, wherein the first input terminal of the polarity selection module is connected to an output terminal of the timing control module, the second input terminal of the polarity selection module is connected to a polarity reversal signal terminal, the first type output terminal of the polarity selection module is connected to the first type input terminal of the source drive module, the second type output terminal of the polarity selection module is connected to the second type input terminal of the source drive module;

when the polarity selection module receives a control signal sent from the timing control module and a polarity reversal signal sent from the polarity reversal signal terminal at the same time, the first type output terminal outputs a first control signal, having a polarity same to that of the control signal, to the first type input terminal of the source drive module, and the second type output terminal outputs a second control signal, having a polarity opposite to that of the control signal, to the second type input terminal of the source drive module;

when the polarity selection module receives only the control signal sent from the timing control module, the first and second type output terminals output the first control signals, having a polarity the same to that of the control signal, to the first and second type input terminals of the source drive module, respectively; and wherein the first control signal and the second control signal both are used to control a polarity of data signals sent from the source drive module to the data lines, the polarity of data signals sent from the source drive module to the data lines under the control of the first control signal is different from the polarity of data signals sent from the source drive module to the data lines under the control of the second control signal.

According to another aspect of the present invention, there is provided a display apparatus comprising: a display panel provided with a plurality of data lines; and the above mentioned display drive circuit.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
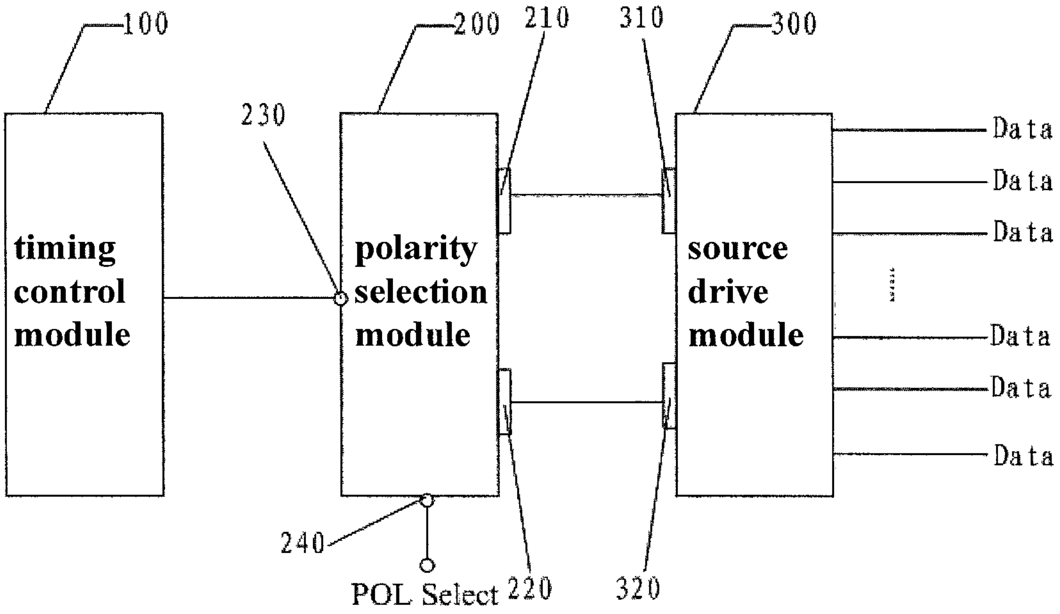
FIG. 1 is an illustrative structure view of a display drive circuit according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a display drive circuit, comprising: a timing control module; a source drive module electrically connected to a plurality of data lines and comprising a first type input terminal and a second type input terminal; and a polarity selection module comprising a first type output terminal, a second type output terminal, a first input terminal and a second input terminal. The first input terminal of the polarity selection module is connected to an output terminal of the timing control module, the second input terminal of the polarity selection module is connected to a polarity reversal signal terminal, the first type output terminal of the polarity selection module is connected to the first type input terminal of the source drive module, the second type output terminal of the polarity selection module is connected to the second type input terminal of the source drive module. When the polarity selection module receives a control signal sent from the timing control module and a polarity reversal signal sent from the polarity reversal signal terminal at the same time, the first type output terminal outputs a first control signal, having the same polarity as that of the control signal, to the first type input terminal of the source drive module, and the second type output terminal outputs a second control signal, having an opposite polarity to that of the control signal, to the second type input terminal of the source drive module. When the polarity selection module receives only the control signal sent from the timing control module, the first and second type output terminals output the first control signals, having the same polarity as that of the control signal, to the first and second type input terminals of the source drive module, respectively. The first control signal and the second control signal both are used to control a polarity of data signals sent from the source drive module to the data lines, the polarity of data signals sent from the source drive module to the data lines under the control of the first control signal is different from the polarity of data signals sent from the source drive module to the data lines under the control of the second control signal.

Hereinafter, it will describe in detail a display drive circuit and a display apparatus according to exemplary embodiments of the present invention with reference to the attached drawings.

FIG. 1 is an illustrative structure view of a display drive circuit according to an exemplary embodiment of the present invention.

As shown in FIG. 1, in an exemplary embodiment of the present invention, the display drive circuit mainly comprises a timing control module 100, a source drive module 300 electrically connected to a plurality of data lines Data and comprising a first type input terminal 310 and a second type input terminal 320, and a polarity selection module 200 comprising a first type output terminal 210, a second type output terminal 220, a first input terminal 230 and a second input terminal 240.

Referring to FIG. 1 again, in the illustrated embodiment, the first input terminal 230 of the polarity selection module 200 is connected to an output terminal of the timing control module 100. The second input terminal 240 of the polarity selection module 200 is connected to a polarity reversal signal terminal POL Select. The first type output terminal 210 of the polarity selection module 200 is connected to the first type input terminal 310 of the source drive module 300, the second type output terminal 220 of the polarity selection module 200 is connected to the second type input terminal 320 of the source drive module 300.

In the embodiment shown in FIG. 1, when the polarity selection module 200 receives a control signal sent from the timing control module 100 and a polarity reversal signal sent from the polarity reversal signal terminal POL Select at the same time, the first type output terminal 210 outputs a first control signal, having the same polarity as that of the control signal, to the first type input terminal 310 of the source drive module 300, and the second type output terminal 220 outputs a second control signal, having an opposite polarity to that of the control signal, to the second type input terminal 320 of the source drive module 300.

Please refer to FIG. 1, in the illustrated embodiment, when the polarity selection module 200 receives only the control signal sent from the timing control module 100, the first type output terminal 210 and the second type output terminal 220 both output the first control signals, having the same polarity as that of the control signal, to the first type input terminal 310 and the second type input terminal 320 of the source drive module 300, respectively.

In an exemplary embodiment of the present invention, as shown in FIG. 1, the first control signal and the second control signal both are used to control the polarity of data signals sent from the source drive module 300 to the data lines Data. The polarity of data signals sent from the source drive module 300 to the data lines Data under the control of the first control signal is different from the polarity of data signals sent from the source drive module 300 to the data lines Data under the control of the second control signal.

In the above embodiments of the present invention, the display drive circuit comprises the timing control module, the polarity selection module, and the source drive module electrically connected to the plurality of data lines. In these embodiments, the control signal sent from the timing control module is input to the source drive module via the polarity selection module. When the polarity selection module receives only the control signal sent from the timing control module, the polarity selection module outputs the first control signals, having the polarity the same as that of the control signal, to the source drive module. When the polarity selection module receives the control signal sent from the timing control module and the polarity reversal signal sent from the polarity reversal signal terminal at the same time, the polarity selection module outputs the first control signal having the polarity the same as that of the control signal, and the second control signal having the polarity opposite to that of the control signal to the source drive module at the same time. Accordingly, the display drive circuit is capable of satisfying requirements of various optical tests performed before display apparatus leave in the factory.

In the display drive circuit according to the above embodiments of the present invention, once the polarity of the first control signal or the second control signal received by the source drive module is reversed, the polarity of the data signal sent from the source drive module to the data lines is also reversed accordingly.

Figure 2:
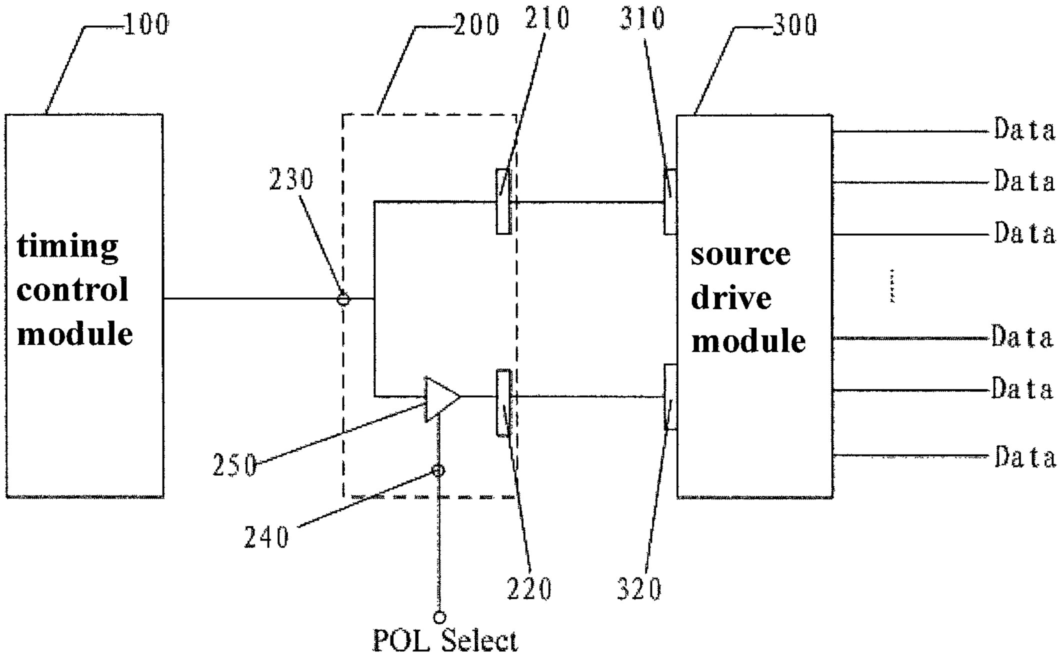
FIG. 2 is an illustrative structure view of a polarity selection module according to an exemplary embodiment of the present invention.

FIG. 2 is an illustrative structure view of a polarity selection module according to an exemplary embodiment of the present invention.

As shown in FIG. 2, in an exemplary embodiment of the present invention, the polarity selection module 200 may further comprise a phase reversion selector 250.

Referring to FIG. 2, in the illustrated embodiment, the first input terminal 230 of the polarity selection module 200 is electrically connected to the first type output terminal 210 directly by a lead, and the first input terminal 230 and the second input terminal 240 of the polarity selection module 200 both are electrically connected to the second type output terminal 220 via the phase reversion selector 250.

In the display drive circuit according to the above embodiments of the present invention, the phase reversion selector configured to change or keep the polarity of the control signal input into the phase reversion selector. In an exemplary embodiment, when the phase reversion selector receives the control signal sent from the first input terminal and the polarity reversal signal sent from the second input terminal at the same time, the phase reversion selector outputs the second control signal having a polarity opposite to that of the control signal to the second type output terminal; when the phase reversion selector receives only the control signal sent from the first input terminal, the phase reversion selector outputs the first control signal having a polarity the same as that of the control signal to the second type output terminal.

In the display drive circuit according to the above embodiments of the present invention, the source drive module may comprise a plurality of first type input terminals and a plurality of second type input terminals Correspondingly, the polarity selection module may comprise a plurality of first type output terminals and a plurality of second type output terminals.

In the display drive circuit according to the above embodiments of the present invention, the number of the first type output terminals of the polarity selection module is set to be equal to that of the second type output terminals of the polarity selection module.

Figure 3:
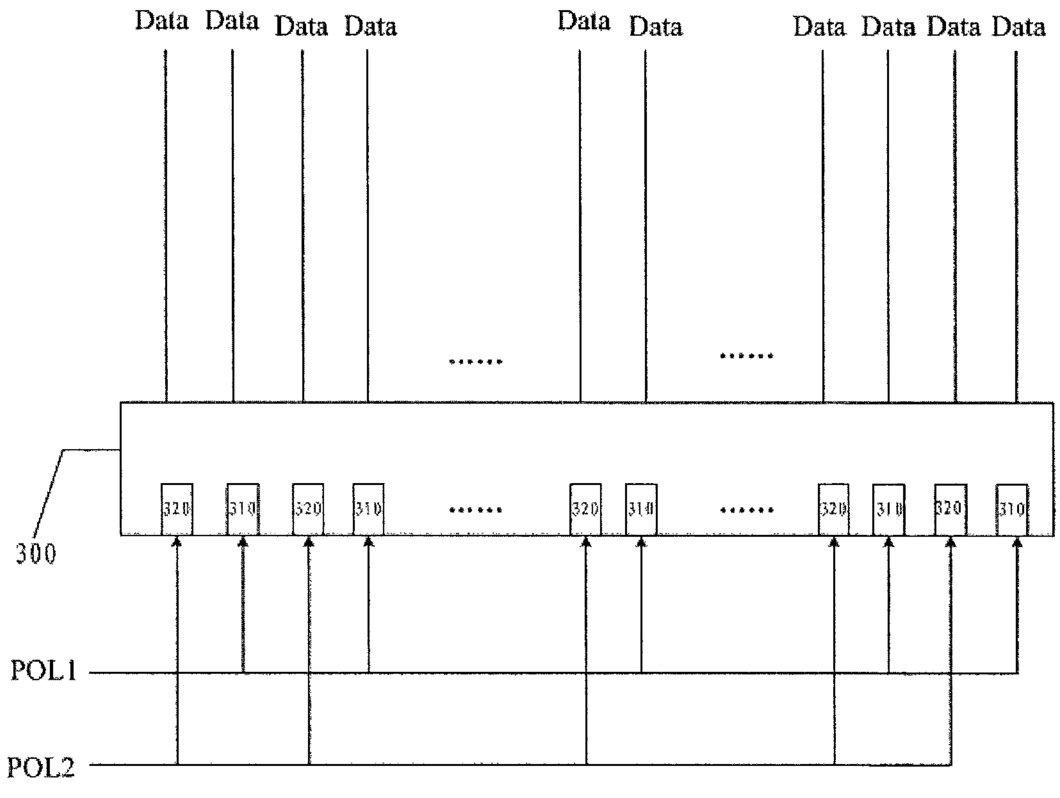
FIG. 3 is an illustrative structure view of a source drive module according to an exemplary embodiment of the present invention.

FIG. 3 is an illustrative structure view of a source drive module according to an exemplary embodiment of the present invention.

As shown in FIG. 3, in an exemplary embodiment of the present invention, the first type input terminals 310 and the second type input terminals 320 of the source drive module 300 are alternately arranged. In this way, when the polarity selection module 200 does not receive the polarity reversal signal, the polarity selection module 200 outputs the first control signals POL1, having the same polarity as that of the control signal, to the first type input terminal 310 and the second type input terminal 320 of the source drive module 300; when the polarity selection module 200 receives the polarity reversal signal, the polarity selection module 200 outputs the first control signal POL1, having the same polarity as that of the control signal, to the first type input terminal 310 of the source drive module 300, and outputs the second control signal POL2, having an opposite polarity to that of the control signal, to the second type input terminal 320 of the source drive module 300. As a result, the first type input terminal 310 and the second type input terminal 320 of the source drive module 300 receive the first control signal POL1 and the second control signal POL2, respectively.

Figure 4:
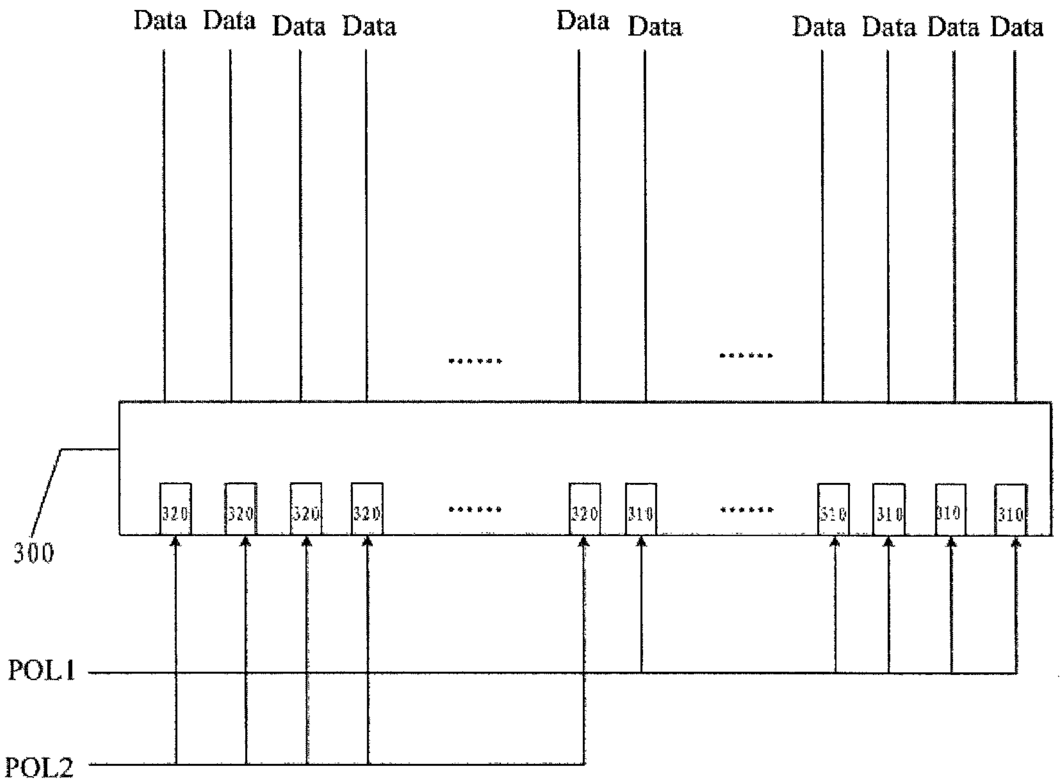
FIG. 4 is an illustrative structure view of a source drive module according to another exemplary embodiment of the present invention.

FIG. 4 is an illustrative structure view of a source drive module according to another exemplary embodiment of the present invention.

In the embodiment shown in FIG. 4, the first type input terminals 310 of the source drive module 300 are consecutively arranged, and the second type input terminals 320 of the source drive module 300 are consecutively arranged. In this way, when the polarity selection module 200 does not receive the polarity reversal signal, the polarity selection module 200 outputs the first control signals POL1, having a polarity the same as that of the control signal, to the first type input terminal 310 and the second type input terminal 320 of the source drive module 300; when the polarity selection module 200 receives the polarity reversal signal, the polarity selection module 200 outputs the first control signal POL1, having a polarity the same as that of the control signal, to the first type input terminal 310 of the source drive module 300, and outputs the second control signal POL2, having a polarity opposite to that of the control signal, to the second type input terminal 320 of the source drive module 300. As a result, the first type input terminals 310 located at one side of an edge portion of the source drive module 300 receive the first control signal POL1, and the second type input terminals 320 located at the other side of the edge portion of the source drive module 300 receive the second control signal POL2.

Although it is not shown, in an exemplary embodiment of the present invention, the source drive module may comprise a plurality of source drive sub-modules each connected to at least one data line, and the plurality of source drive sub-modules are electrically connected to the first type output terminals or the second type output terminals of the polarity selection module, respectively.

Although it is not shown, in an exemplary embodiment of the present invention, the source drive module may mainly comprise a shift-register circuit, a latch circuit, a digital to analog (D/A) conversion circuit, a gamma correction circuit, etc. In order to output the data signals to the data lines, the source drive module also needs other signals, in addition to the first and second control signals mentioned in the above embodiments of the present invention, generated by the timing control module, for example, a timing control signal (CKH), a row synchronization signal (STH), a small amplitude differential signal (RSDS), etc. Since it is obvious for those skilled in this art about the source drive module how to output the data signals to the data lines, the detailed description of it is omitted herein, for the purpose of concise.

According to another general concept of the present invention, there is also provided a display apparatus comprising: a display panel provided with a plurality of data lines; and a display drive circuit according to any one of the above embodiments. In an exemplary embodiment of the present invention, the display apparatus may comprise any product or member with a display function, such as, a mobile telephone, a panel computer, a TV, a display, a notebook computer, a digital photo frame, a navigating instrument, and so on. As other necessary components of the display apparatus are well known by those skilled in this art, therefore, the detailed descriptions of them are omitted herein and should not be restrictive to the present invention. Since the display drive circuit of the display apparatus has been described in the above exemplary embodiments, the detailed description thereof is omitted herein.

In the display drive circuit and the display apparatus according to the above embodiments of the present invention, the display drive circuit comprises the timing control module, the polarity selection module, and the source drive module electrically connected to data lines. In these embodiments, the control signal sent from the timing control module is input to the source drive module via the polarity selection module. When the polarity selection module receives only the control signal sent from the timing control module, the polarity selection module outputs the first control signals, having the same polarity as that of the control signal, to the source drive module. When the polarity selection module receives the control signal sent from the timing control module and the polarity reversal signal sent from the polarity reversal signal terminal at the same time, the polarity selection module outputs the first control signal having the polarity the same as that of the control signal, and the second control signal having the polarity opposite to that of the control signal to the source drive module at the same time. Accordingly, the display drive circuit is capable of satisfying requirements of various optical tests performed before display apparatus go out.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A display drive circuit, comprising:

a timing control module;

a source drive module electrically connected to a plurality of data lines and comprising a first type input terminal and a second type input terminal; and a polarity selection module comprising a first type output terminal, a second type output terminal, a first input terminal and a second input terminal, wherein the first input terminal of the polarity selection module is connected to an output terminal of the timing control module, the second input terminal of the polarity selection module is connected to a polarity reversal signal terminal, the first type output terminal of the polarity selection module is connected to the first type input terminal of the source drive module, the second type output terminal of the polarity selection module is connected to the second type input terminal of the source drive module;

when the polarity selection module receives a control signal sent from the timing control module and a polarity reversal signal sent from the polarity reversal signal terminal at the same time, the first type output terminal outputs a first control signal, having the same polarity as that of the control signal, to the first type input terminal of the source drive module, and the second type output terminal outputs a second control signal, having an opposite polarity to that of the control signal, to the second type input terminal of the source drive module;

when the polarity selection module receives only the control signal sent from the timing control module, the first and second type output terminals output the first control signals, having the same polarity as that of the control signal, to the first and second type input terminals of the source drive module, respectively; and wherein the first control signal and the second control signal both are used to control a polarity of data signals sent from the source drive module to the data lines, the polarity of data signals sent from the source drive module to the data lines under the control of the first control signal is different from the polarity of data signals sent from the source drive module to the data lines under the control of the second control signal, wherein the polarity selection module further comprises a phase reversion selector;

wherein the first input terminal of the polarity selection module is electrically connected to the first type output terminal directly by a lead; and wherein the first input terminal and the second input terminal of the polarity selection module both are electrically connected to the second type output terminal via the phase reversion selector.

2. The display drive circuit according to claim 1, wherein the source drive module comprises a plurality of first type input terminals and a plurality of second type input terminals, and wherein the polarity selection module comprises a plurality of first type output terminals and a plurality of second type output terminals.

3. The display drive circuit according to claim 2, wherein the number of the first type output terminals of the polarity selection module is equal to that of the second type output terminals of the polarity selection module.

4. The display drive circuit according to claim 3, wherein the first type input terminals and the second type input terminals of the source drive module are alternately arranged.

5. The display drive circuit according to claim 4, wherein the source drive module comprises a plurality of source drive sub-modules each connected to at least one data line; and wherein the plurality of source drive sub-modules are electrically connected to the first type output terminals or the second type output terminals of the polarity selection module, respectively.

6. The display drive circuit according to claim 3, wherein the first type input terminals of the source drive module are consecutively arranged, and the second type input terminals of the source drive module are consecutively arranged.

7. The display drive circuit according to claim 6, wherein the source drive module comprises a plurality of source drive sub-modules each connected to at least one data line; and wherein the plurality of source drive sub-modules are electrically connected to the first type output terminals or the second type output terminals of the polarity selection module, respectively.

8. The display drive circuit according to claim 3, wherein the source drive module comprises a plurality of source drive sub-modules each connected to at least one data line; and wherein the plurality of source drive sub-modules are electrically connected to the first type output terminals or the second type output terminals of the polarity selection module, respectively.

9. The display drive circuit according to claim 2, wherein the source drive module comprises a plurality of source drive sub-modules each connected to at least one data line; and wherein the plurality of source drive sub-modules are electrically connected to the first type output terminals or the second type output terminals of the polarity selection module, respectively.

10. The display drive circuit according to claim 1, wherein the source drive module comprises a plurality of source drive sub-modules each connected to at least one data line; and wherein the plurality of source drive sub-modules are electrically connected to the first type output terminals or the second type output terminals of the polarity selection module, respectively.

11. The display drive circuit according to claim 1, wherein the source drive module comprises a plurality of source drive sub-modules each connected to at least one data line; and wherein the plurality of source drive sub-modules are electrically connected to the first type output terminals or the second type output terminals of the polarity selection module, respectively.

12. A display apparatus, comprising:

a display panel provided with a plurality of data lines; and a display drive circuit according to claim 1.

13. The display apparatus according to claim 12, wherein the polarity selection module further comprises a phase reversion selector;

wherein the first input terminal of the polarity selection module is electrically connected to the first type output terminal directly by a lead; and wherein the first input terminal and the second input terminal of the polarity selection module both are electrically connected to the second type output terminal via the phase reversion selector.

14. The display apparatus according to claim 13, wherein the source drive module comprises a plurality of source drive sub-modules each connected to at least one data line; and wherein the plurality of source drive sub-modules are electrically connected to the first type output terminals or the second type output terminals of the polarity selection module, respectively.

15. The display apparatus according to claim 12, wherein the source drive module comprising a plurality of first type input terminals and a plurality of second type input terminals, and wherein the polarity selection module comprising a plurality of first type output terminals and a plurality of second type output terminals.

16. The display apparatus according to claim 15, wherein the number of the first type output terminals of the polarity selection module is equal to that of the second type output terminals of the polarity selection module.

17. The display apparatus according to claim 16, wherein the first type input terminals and the second type input terminals of the source drive module are alternately arranged.

18. The display apparatus according to claim 16, wherein the first type input terminals of the source drive module are consecutively arranged, and the second type input terminals of the source drive module are consecutively arranged.

19. The display apparatus according to claim 12, wherein the source drive module comprises a plurality of source drive sub-modules each connected to at least one data line; and wherein the plurality of source drive sub-modules are electrically connected to the first type output terminals or the second type output terminals of the polarity selection module, respectively.

* * * * *